United States Patent
Radin et al.

[15] 3,668,630
[45] June 6, 1972

[54] LOW LIQUID LEVEL INDICATOR

[72] Inventors: Bernard G. Radin, Oak Park; Lawrence J. Vanderberg, Ann Arbor, both of Mich.

[73] Assignee: Ford Motor Company, Dearborn, Mich.

[22] Filed: June 22, 1970

[21] Appl. No.: 48,217

[52] U.S. Cl. .............................340/59, 340/244 C, 73/304
[51] Int. Cl. .......................................B60q 1/00, G01f 23/24
[58] Field of Search.....................340/59, 244 C; 123/41.15; 73/304

[56] References Cited

UNITED STATES PATENTS 3,550,080   12/1970   Wenzel.....................................340/59
2,618,248   11/1952   Lindberg, Jr. et al..............340/244 C Primary Examiner—John W. Caldwell
Assistant Examiner—Glen R. Swann, III
Attorney—John R. Faulkner and Keith L. Zerschling

[57] ABSTRACT

A low liquid level indicator particularly adapted for use in an automotive vehicle which employs the alternating current voltage that appears across the primary winding of the ignition system of the vehicle to energize a probe which is adapted to be immersed in a liquid. A solid state switching network is employed to control the energization of a warning means from a source of direct current electrical energy, for example, the vehicle battery. The probe and the container holding the liquid are connected in shunt with the control electrode of the solid state switching network. When the liquid is at a satisfactory operating level, the probe is effectively immersed in the liquid and the impedance of the circuit comprised of the probe, liquid and container is sufficiently low that the voltage applied to the control electrode of the solid state switching network is insufficient to switch it to a conducting state and thus energize the warning means. If the liquid level falls to an unsatisfactory operating level, however, the impedance of the probe to container circuit is increased markedly thereby increasing the voltage level applied to the control electrode of the solid state switching network. This switches the solid state switching network to a conducting state and energizes the warning means.

4 Claims, 2 Drawing Figures

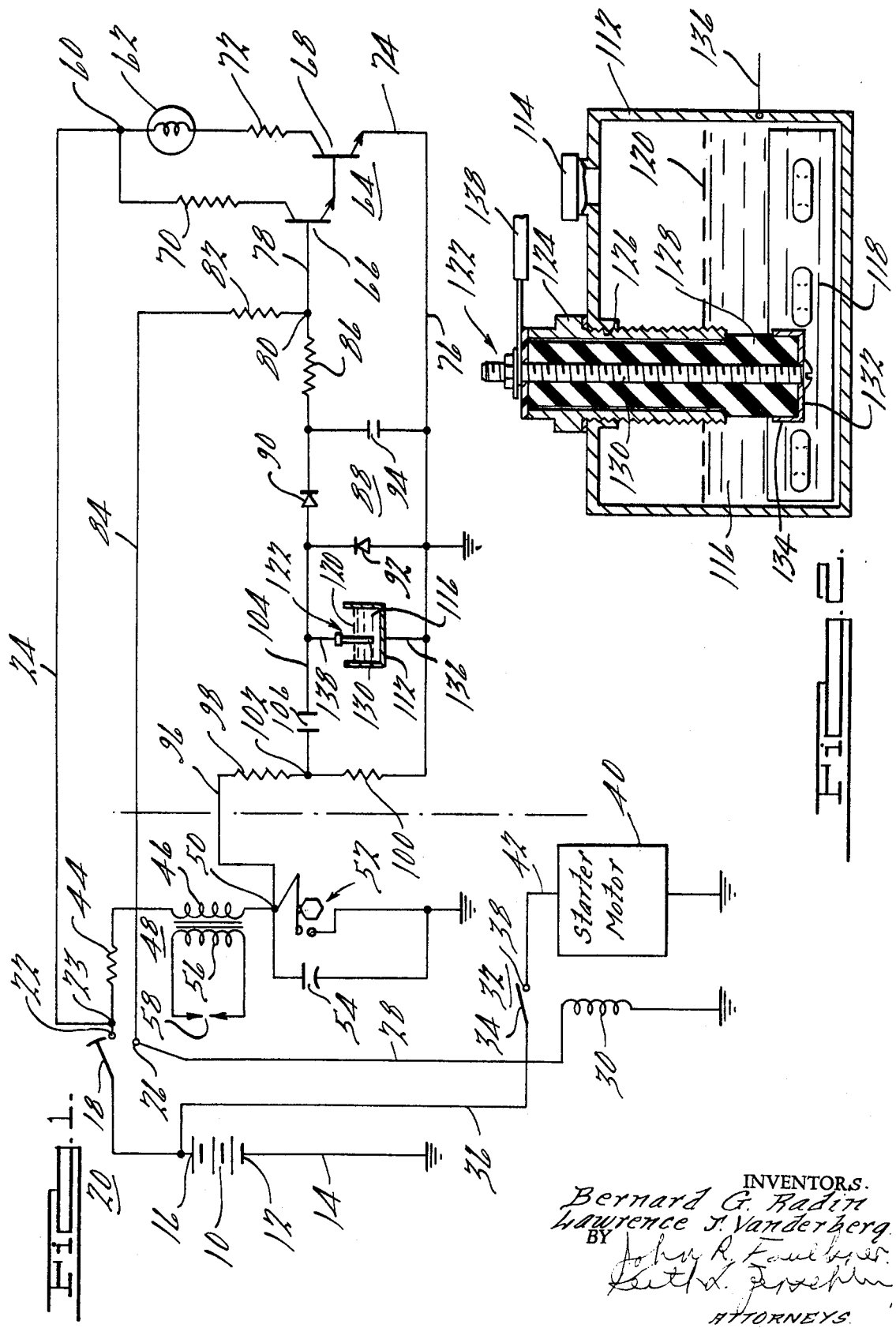

3,668,630

LOW LIQUID LEVEL INDICATOR

BACKGROUND OF THE INVENTION

This invention relates to a low liquid level indicator and, more particularly, to a low liquid level indicator that may be readily used to indicate a low liquid level in a container, for example, a radiator used in an automotive vehicle.

In the conductivity type of liquid level sensors, alternating current is used in preference to direct current because it eliminates plating or deposits on the electrodes of the probe immersed in the liquid. There have been suggestions in the prior art for using an alternating current to energize liquid level sensing means. It has been suggested, for example, that in an automotive vehicle, alternating current be derived from the stator windings of the alternator employed to generate electrical energy for charging the vehicle battery and for operating the electrical loads of the vehicle. The present invention utilizes a novel liquid level detector or indicator circuit and includes an inexpensive and reliable means for generating an alternating current applied to a probe and a container carrying a liquid in order to sense the liquid level in the container.

SUMMARY OF THE INVENTION

In the present invention, a solid state switching network is connected in circuit with a source of direct current electrical energy and a warning means for giving a warning when the level of a liquid in a container, for example, a radiator, falls below a satisfactory operating level. A probe is electrically insulated from a container holding the liquid, the level of which is to be indicated, and this probe will extend effectively into the liquid when it is at a satisfactory operating level. The probe, liquid and container form a part of a voltage divider that is coupled to the primary winding of the ignition coil for the internal combustion engine of the vehicle utilizing the present invention. The voltage divider includes a resistor connected in series with the probe, the liquid and the container. The junction of this resistor and the probe is connected to the control electrode of the solid state switching network. DC isolation is also provided for the probe so that only alternating current electrical energy, generated in the primary winding of the ignition coil, as the breaker points of the ignition system open and close, is present between the probe and the container thereby preventing any electroplating action that may otherwise occur.

When the liquid in the container is at a proper or satisfactory operating level, the probe effectively extends into the liquid thereby providing a low impedance path for the alternating current. The junction between the resistor and the probe is, therefore, at a potential sufficiently low that it will not switch the solid state switching device to a conducting state. When the liquid level falls below the probe, the impedance of the circuit element formed by the probe, the liquid and the container will increase to a point where the junction potential will be raised sufficiently to switch the solid state switching network into a conducting state. When the solid state switching network switches to a conducting state, the warning means, which is preferably in the form of a lamp, is energized from the battery of the vehicle through this solid state switching network.

A prove-out means for the solid state switching network and the warning lamp is also provided. During starting operations of the internal combustion engine of the vehicle, the control electrode of the solid state switching network is energized from the vehicle battery thereby switching it to a conducting state and energizing the warning lamp. When starting operations are terminated, this circuit is broken and the solid state switching network is switched back to a nonconducting state and the warning means or lamp is de-energized.

An object of the present invention is the provision of a low liquid level indicator that is designed to indicate a low liquid level in a container used in an automotive vehicle and that utilizes existing electrical components present in the vehicle thereby minimizing complexity and cost.

A further object of the invention is the provision of a low liquid level indicator which is inexpensive and reliable and employs alternating current electrical energy generated in the vehicle ignition system to energize a liquid level sensing probe in a container holding the liquid.

Other objects and attendant advantages of the present invention will become more readily apparent as the specification is considered in connection with the attached drawings.

BRIEF DESCRIPTION OF THE DRAWINGS

FIG. 1 is a circuit diagram of the low liquid level indicator of the present invention; and FIG. 2 is a sectional view through a liquid container and showing the relationship of the container, the liquid and the probe of the present invention.

DESCRIPTION OF THE PREFERRED EMBODIMENT

Referring now to the drawings in which like reference numerals designate like parts throughout the several views thereof, there is shown, in FIG. 1, a source of direct current electrical energy in the form of an electrical storage battery 10, having one terminal thereof, negative terminal 12, connected to ground through a line 14, and the other terminal thereof, positive terminal 16, connected to a conductive movable arm 18 of an ignition switch 20. The ignition switch 20 has an "ON" terminal 22 connected through a junction 23 to a line 24. The ignition switch 20 also has a "Start" terminal 26 which is connected through line 28 to a solenoid 30 of a starter relay 32. The armature 34 of the starter relay 32 is connected through line 36 to the positive terminal 16 of the storage battery 10. A fixed contact 38 of the starter relay 32 is connected to starter motor 40 via lead 42.

The junction 23, that is connected to the "ON" terminal 22 of ignition switch 20 and to the line 24, is also connected through current limiting resistor 44 to one terminal of primary winding 46 of an ignition coil 48. The other terminal of the primary winding 46 is connected to a junction 50, and this junction 50 is coupled to ground through distributor points 52 shunted by a capacitor 54. The ignition coil 48 also includes a secondary winding 56 that may be coupled sequentially to the spark plugs of the internal combustion engine, one of which is shown at 58, via a conventional distributor system (not shown).

The line 24, energized from the "ON" terminal 22 of ignition switch 20, is connected to a junction 60 that in turn is connected to one terminal of a warning means 62, preferably in the form of a warning lamp. A solid state switching network 64 is employed to control the energization of the warning means or lamp 62, and it comprises a first transistor 66 and a second transistor 68. The first transistor 66 has its collector connected to junction 60 through a transient protection resistor 70, and its emitter connected to the base of the second transistor 68. The collector of the second transistor 68 is connected through a transient protection resistor 72 to the other terminal of the warning means or lamp 62, and the emitter of transistor 68 is connected through lead 74 to grounded line 76. The control or base electrode of first transistor 66 is connected via lead 78, junction 80, resistor 82 and line 84 to the "Start" terminal 26 of the ignition switch 20. This control or base electrode is also connected through lead 78, junction 80 and resistor 86 to a rectifier-filter 88 comprised of diode 90, diode 92 and capacitor 94.

The junction 50, between the primary winding 46 of the ignition coil 48 and the distributor contacts 52, is connected through lead 96 to a voltage divider comprised of resistors 98 and 100. A junction 102, positioned between the resistors 98 and 100, is connected to line 104 through an AC coupling means in the form of capacitor 106. The line 104 is in turn connected to the rectifier-filter 88 comprised of diodes 90, 92 and capacitor 94.

Referring now to FIG. 2, there is shown a container 112 having a closure cap 114 for replenishment of a liquid 116 carried by the container 112. The container 112 is represented here in schematic form and it may be a radiator of an automotive vehicle, in which case, the structure designated by the numeral 118 is the radiator core. The liquid in the container should have a liquid level 120 that covers this core. A probe, generally designated by the numeral 122, includes a threaded outer casing 124 that is threaded into a threaded bore 126 in the container 112. An electrical insulating bushing 128 electrically insulates the operative cylindrical portion 130 of the probe from the threaded outer casing 124.

This operative cylindrical portion 130 of the probe 122 may be constructed of a suitable metal, for example, steel or brass, and it extends completely through the electrical insulating bushing 128. A metal cap 132, connected to the operative cylindrical portion 130, extends across the lower end of the electrical insulating bushing 128 and it has an axially extending cylindrical flange 134 which extends upwardly over the lower end of the electrical insulating bushing 128. The container 112 is also constructed of an electrically conductive material, for example, brass, copper or steel, and it has a lead 136 electrically connected to it.

When the liquid 116 has a satisfactory operating level, the threaded outer casing 124, which is constructed of a conductive material, is immersed in the liquid so that the liquid serves to provide an electrical path between the cap 132, connected to operative cylindrical portion 130 of the probe, and this threaded outer casing 124.

Referring back to FIG. 1, the lead 136, connected to the container 112, is connected at its other end to grounded line 76, while the operative portion 130 of the probe 122 is connected to line 104 via lead 138.

OPERATION

During starting operations of the automotive vehicle that employs the present invention, the ignition switch 20 is moved so that the movable arm 18 engages the "ON" terminal 22 as well as the "Start" terminal 26. The engagement of the movable arm 18 with the "Start" terminal 26 energizes solenoid 30 of the start relay 32 from the electrical storage battery 10 thereby causing the armature 34 of the relay 32 to engage the fixed contact 38. This results in the energization of the starter motor 40 from the source of electrical energy 10 via lead 36, armature 34, contact 38 and lead 42. At the same time, a positive voltage will be applied to the control or gate electrode of transistor 66 of the solid state switching network 64 via "-Start" terminal 26, lead 84, resistor 82 and lead 78.

Application of this positive potential to the control electrode of transistor 66 will switch transistor 66 to a conducting state thereby switching transistor 68 to a conducting state and energizing the warning means or lamp 62 from the source of electrical energy 10. The resistor 86 has sufficient resistance to isolate the rectifier-filter 88 and the probe 122 from the voltage of the battery 10 during this starting operation. Thus, during starting operations, means are provided for checking the operative condition of the warning lamp or means 62 and of the solid state switching network 64.

After the internal combustion engine of the vehicle utilizing the present invention has been started by the starter motor 40, the movable arm 18 of the ignition switch 20 is moved so that it no longer contacts "Start" terminal 26 and contacts the "ON" terminal 22 only. This action terminates the energization of the solenoid 30 of starter relay 32 and the control or base electrode of transistor 66 of the solid state switching network 64 from the "Start" terminal 26. As a result, the solid state switching network, including transistors 66 and 68, is switched to a nonconducting state thereby de-energizing the warning means or lamp 62.

During the operation of the internal combustion engine of the vehicle utilizing the present invention, the primary winding 46 of ignition coil 48 is energized from the source of electrical energy 10 via movable arm 18 and "ON" terminal 22 of ignition switch 20, junction 23 and current limiting resistor 44.

The distributor points 52 are opened and closed in synchronism with the operation of the engine to develop periodically and cyclically a voltage across the primary winding 46 that in turn is transformed to a higher voltage in the secondary winding 56. This higher voltage is applied sequentially to the spark plugs of the engine including spark plug 58 by the distributor (not shown).

The voltage generated across the primary winding 46 and the breaker points 52, when they open, is applied, via junction 50, to the voltage divider comprised of resistors 98 and 100. This voltage divider is designed so that approximately 1/5 of this voltage appears at junction 102 and is applied to the AC coupling capacitor 106. The magnitude of the resistance of resistor 98 should be large, for example, in the range of 50 K to 150 K ohms so as not to load the primary winding 46 of the ignition coil 48.

It can be appreciated that the voltage appearing at the junction 102 is a pulsating or alternating current that may have a substantial direct current component. This direct current component is eliminated by the coupling means or capacitor 106. The remaining alternating voltage, with substantially zero DC component, is then applied to the operative portion 130 of the probe 122 via lead 104 and lead 138. This alternating voltage is also applied via lead 104 to the rectifier-filter 88 which rectifies this alternating voltage. The resulting direct current voltage is applied to the control or base electrode of transistor 66 of solid state switching network 64 via resistor 86 and lead 78.

When the liquid 116 is at a satisfactory operating level so that the end of the threaded outer casing 124 of probe 122 is immersed in the liquid 116, the impedance of the electrical circuit element formed by the operative portion 130 of the probe, the liquid 116, the outer threaded casing 124 and the container 112 is very low. This impedance may be on the order of 200 to 2,000 ohms thereby effectively providing a short circuit for the voltage appearing on the line 104. As a result, there is insufficient voltage applied to the base or control electrode of transistor 66 of solid state switching network 64 to switch it to a conducting state. The warning means or lamp 62, therefore, is unenergized and the vehicle operator is apprised of the fact that the liquid 116 in the container 112 is at a satisfactory operating level.

If the liquid level 120 in the container 112 falls below the satisfactory operating level so that the end of the threaded outer casing 124 is above the level of the liquid 116, the circuit path from the cap 132 of the central operative portion 130 of the probe 122 and the end of the threaded outer casing 124 will no longer be through the liquid 116. As a result, the impedance of the circuit from the operative central portion 130 of the probe 122 to the container 112 will increase markedly. This will raise the voltage on the line 104 and the voltage that is applied to the rectifier-filter 88. The resulting increased direct current voltage is then applied to the base or control electrode of transistor 66 of solid state switching network 64 via resistor 86 and lead 78. This voltage is sufficient to switch transistors 66 and 68 of solid state switching network 64 into their conducting states thereby energizing the warning means or lamp 62 from the source of electrical energy 10 and through the output circuit of transistor 68. This apprises the vehicle operator that the liquid level 120 of the liquid 116 in container 112 has fallen below a satisfactory operating level.

When the vehicle operator is so apprised, he may take corrective action to replenish the liquid in the container 112. When this has been accomplished and the liquid level 120 rises above the end of the threaded outer casing 124, a circuit will again be completed through the liquid 116 between the cap 132 of the central operative portion 130 of the probe 122 and this threaded outer casing 124. As a result, the impedance of this circuit will decrease markedly thereby lowering the voltage applied to the base or control electrode of transistor 66 of solid state switching network 64 to a level where transistor 66 will be switched to a nonconducting state. When transistor 66 is switched to a nonconducting state, transistor 68 is also switched to a nonconducting state thereby de-energizing the warning means or lamp 62.

Thus, the present invention provides a reliable and uncomplicated low liquid level indicator which employs the pulsating or alternating current voltage generated in the ignition system of an internal combustion engine to energize a liquid level sensing means in the form of a probe adapted to be immersed in the liquid. When the probe is effectively immersed in the liquid and the liquid is at a satisfactory operating level, the impedance of the circuit element comprising the probe, the liquid and the container for the liquid is at a level insufficient to cause the energization of a warning means. On the other hand, if the level of the liquid falls to an unsatisfactory level, a circuit is no longer completed between the probe and the container through the liquid and the impedance between the probe and the container rises to a point sufficient to energize the warning means. This apprises the vehicle operator of the unsatisfactory level of the liquid in the container.

What is claimed is:

1. A low liquid level indicator for use in an automotive vehicle comprising a source of direct current electrical energy, a warning means, a solid state switching network having output electrodes connected in circuit with said warning means and with said source of direct current electrical energy, said solid state switching network having a control electrode, said solid state switching network energizing said warning means from said source of direct current electrical energy when a signal having a first level is applied to said control electrode and de-energizing said warning means when a signal having a second level is applied to said control electrode, said automotive vehicle having an internal combustion engine, said internal combustion engine having an ignition coil comprising a primary winding and a secondary winding, said primary winding connected to said source of direct current electrical energy and means operated in synchronism with said engine for periodically interrupting current through said primary winding, a container containing a liquid and a probe electrically insulated from said container, said probe being effectively immersed in said liquid when said liquid is at a satisfactory operating level in said container and effectively out of contact with the liquid when the liquid falls below the satisfactory operating level, said probe, liquid and container forming an electrical circuit element connected in shunt with said control electrode of said solid state switching network and means coupling said primary winding of said ignition coil to said probe, said means including high impedance means having a minimum value of 50,000 ohms for preventing loading of the primary winding of said ignition coil, the impedance value of said electrical circuit element being selected to provide said second level of said signal on the control electrode of said solid state switching network when the liquid is at a satisfactory operating level and to provide said first level of said signal on said control electrode when the liquid is below a satisfactory operating level.

2. The combination of claim 1 and further comprising AC coupling means coupled to said primary winding of said ignition coil and to said probe for reducing the direct current component of the electrical energy emanating from said primary winding of said ignition coil to substantially zero.

3. The combination of claim 2 and further comprising a starter motor for starting the internal combustion engine of the automotive vehicle, and switch means coupled to said source of electrical energy and to said starter motor and to said control electrode of said solid state switching network during starting operations for temporarily switching said solid state switching network to a conducting state and energizing said warning means during starting operations.

4. The combination of claim 1 in which said means operated in synchronism with said engine for periodically interrupting current through said primary winding is connected in series with said primary winding, said high impedance means comprises a voltage divider connected across said means for periodically interrupting current through said primary winding and said probe is connected to an intermediate point on said voltage divider.

* * * * *